June 6, 1961     W. L. THOMSON     2,987,603
RADIANT HEATING
Filed Nov. 25, 1957
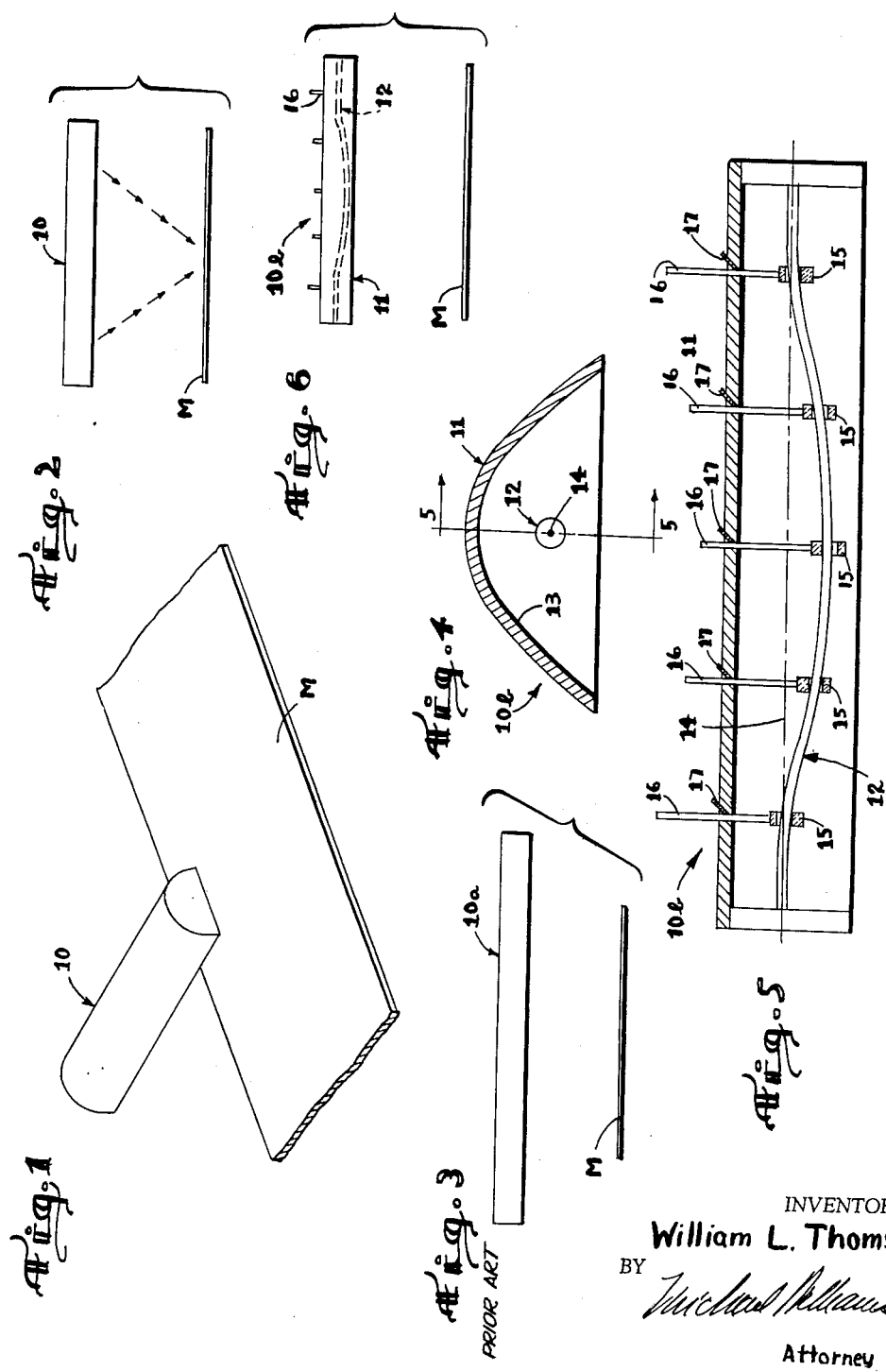
INVENTOR.
William L. Thomson
BY
Attorney United States Patent Office 2,987,603
Patented June 6, 1961

2,987,603
RADIANT HEATING
William L. Thomson, Pittsburgh, Pa., assignor to Edwin L. Wiegand Company
Filed Nov. 25, 1957, Ser. No. 698,564
5 Claims. (Cl. 219—34)

The present invention relates to radiant heating, more particularly to methods of and devices for effecting a desired pattern of heat distribution on material to be heated, and the principal object of the invention is to provide new and improved methods and devices of such character.

In the past and especially when heating strip material my means of radiant heat, it has been difficult to achieve even heating from edge to edge of the material. Invariably, the center of the material tends to become heated more than the edges. This apparently results for two reasons. Firstly, the center of the material tends to receive a greater amount of effective radiation than do the edges. Secondly, heat is dissipated more quickly from the edges of the material than from the center and this heat loss tends to lower the temperature of the edges.

Attempts have been made to compensate for the above mentioned uneven heating of material; however, these attempts have not been satisfactory since most have required expensive constructions which, even if they performed satisfactorily under a given set of conditions, only did so as long as the conditions remained unchanged.

The present invention provides an economical and flexible device for and method of radiantly heating material to provide the desired pattern of heat distribution. Other advantages of the present invention over the prior art will readily become apparent from a study of the following description and from the drawings appended hereto.

In the drawing accompanying this specification and forming a part of this application there is shown, for purpose of illustration, an embodiment which the invention may assume, and in this drawing:

FIGURE 1 is a generally diagrammatic perspective view of an elongated radiant heater arranged for heating strip material from edge to edge, FIGURE 2 is a side elevational view of the heater and the material shown in FIGURE 1, FIGURE 3 is a view similar to FIGURE 2 of a prior art solution to the problem of achieving even heating from edge to edge of the material, FIGURE 4 is an enlarged transverse sectional view through the radiant heater assembly employed in carrying out the present invention, FIGURE 5 is a longitudinal sectional view therethrough generally corresponding to the line 5—5 of FIGURE 4, and FIGURE 6 is a view similar to FIGURE 2 but illustrating the radiant heater assembly shown in FIGURE 5.

While the present invention is hereinafter described and is shown in the drawings as being used in heating strip material, it is to be understood that this use is but illustrative and that the invention is equally well suited for use with any material of considerable span which must be heated either evenly or with any other desired pattern of heat distribution.

For a more complete understanding of the present invention and of the problems solved thereby, a brief disclosure of conventional radiant heating of strip material is advisable. As seen in FIGURES 1 and 2, the usual arrangement comprises a radiant heater 10 spaced some little distance from the material M to be heated and the heater usually is disposed flatwise of the material and extends from edge to edge thereof so that the rays emanating from the heater will be directed on to the material. For maximum efficiency, the heater usually comprises an elongated, trough-like reflector within which is mounted an elongated radiant heat generator (not shown) which frequently, though not necessarily, is provided by an electric resistance heating element of any suitable type.

As previously mentioned, the conventional radiant heating arrangement illustrated in FIGURE 2 is often unsatisfactory because the center of the material reaches a materially higher temperature than do its edges. This apparently is in part caused by the fact that while the center of the material receives radiation not only from the directly adjoining heater portion but also from both sides thereof, as indicated by the arrows in FIGURE 2, either edge of the material receives radiation from only one side of a respective directly adjoining heater portion.

In attempting to reduce the temperature differential between the center of the material and its edges, heaters 10a, (see FIGURE 3) of a length to project materially beyond the edges of the material, have been employed. While this achieves a partial solution to heating the material evenly from edge to edge since each edge receives radiation from both sides of a respective adjoining heater portion, it is not completely satisfactory since a temperature differential still exists because of the much greater heat loss at the edges of the material than at the center thereof. Moreover, a heater of the type shown in FIGURE 3 is considerably more expensive than that shown in FIGURE 2 because of its much greater length and as a result of such length, mounting problems sometimes arise as well as problems presented by the availability of space.

The present invention permits the use of a heater whose effective heating length need be no greater than the span from edge to edge of the material but which will, nevertheless, heat the material evenly from edge to edge. Furthermore, a heater constructed in accordance with the present invention is flexible in that it may readily be adjusted to provide precisely the heating pattern desired. For example, the present invention will not only heat material evenly but can also be employed to provide a greater concentration of heat at one or more places in the material being heated. By way of illustration, it can be employed to heat the edges of the material to a higher temperature than the center if such should be required.

As shown in FIGURES 4 and 5, the heater assembly 10b presently employed in carrying out the invention comprises a rigid, elongated, rectilinear, trough-like reflector 11 in which is mounted an elongated, sheathed, embedded, tubular electric resistance heating element 12. As best seen in FIGURE 4, the reflector has a generally parabolic reflecting surface 13 which provides a focal center point 14. Obviously, since reflector 11 is elongated, focal point 14 is actually a line which extends longitudinally of the reflector.

It will be understood that with heating element 12 disposed within the reflector in coincidence with the focal center point (or line) 14, maximum radiation from element 12 will be reflected by the reflector. If, however, the element is displaced from the focal center line, the efficiency of the reflector will be reduced and less of the element's radiation will be reflected. Accordingly, this is the principle employed in carrying out the present invention.

With reference to FIGURE 5, the ends of heating element 12 are supported at respective ends of the reflector and in coincidence with focal center line 14 by any suitable means which, in the present embodiment, preferably cover and protect the electrical connections at respective element ends. Element 12 is also supported at places intermediate its ends and in the present embodiment is shown supported at five such places. Each intermediate support is herein shown to comprise a heat resistant collar 15 which is secured by any suitable means to a rod 16. Each rod 16 slidably extends through a respective aperture formed in the reflector and each may be locked against axial movement by any convenient means such as, for example, by means of respective set screws 17 or the like which are threaded into the reflector and engage respective rods 16.

As seen in FIGURE 5, rods 16 have been adjusted to deflect the central portion of the flexible heating element 12 from focal center line 14 of the reflector. This deflection of element 12 is preferably gradual with the ends remaining at the focal center line and with the center displaced the maximum amount from the focal center line. With the element thus deflected from the focal center line, the reflective efficiency of the central portion of the heater assembly is considerably reduced from that of its ends and with the efficiency of the central portion of the assembly reduced, there will be a corresponding reduction in temperature of the center of the material M exposed to the radiation of the heater. Accordingly, if the central portion of the heating element is properly deflected from its focal center line as indicated in FIGURE 6, the material will be heated evenly from one edge to the other thus solving completely the problem of combating the tendency of the center of the material to become hotter than its edges.

Obviously, if uneven heating should occur because of a change in the material being heated, weather conditions, a change in the spacing between the heater assembly and the material or for any other reason, even heating may readily be re-established merely by adjusting rods 16 to move the heating element toward or away from the focal center line of the reflector as required. Furthermore, while the present invention has been disclosed as being concerned with heating material evenly from one marginal edge to another, it is to be understood that it may as readily be employed to heat certain material portions to a higher temperature than other material portions.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A radiant heater assembly, comprising an elongated reflector having a reflecting surface parabolic in transverse section, an elongated metal-sheathed electric heating element carried by said reflector with its opposite ends held aligned with the focal point of said parabolic reflector surface, and a plurality of members spaced along the length of said heating element, each member being engageable with an adjoining portion of said element and adjustably carried by said reflector for movement to bend the engaged element portion in a direction transversely of the focal point of said parabolic reflector surface.

2. An elongated radiant heater assembly whose effective heat output varies from end to end, comprising an elongated radiant heat generator, and an elongated reflector spaced transversely of said generator for reflecting radiation emanating therefrom, the transverse spacing between adjoining intermediate portions of said generator and said reflector differing from the transverse spacing between adjoining end portions of said reflector and said generator to thereby vary the heat-reflective efficiency of the assembly from end to end thereof and thus provide a desired heating pattern on work positioned for interception of the radiation from said generator.

3. The construction of claim 2 wherein the ends of said generator are transversely spaced substantially the same distance from respective adjoining reflector ends and wherein the intermediate portion of said generator is transversely spaced a different distance from the adjoining intermediate portion of said reflector.

4. The construction of claim 2 wherein said generator is transversely flexible and further comprising means for deflecting longitudinally spaced generator portions toward and away from said reflector to vary the spacing therebetween and thus vary the heating pattern of said assembly.

5. The construction of claim 4 wherein said generator comprises a metal sheathed, electric resistance heating element.

References Cited in the file of this patent

UNITED STATES PATENTS

| | | |
|---|---|---|
| 1,077,676 | Cubitt | Nov. 4, 1913 |
| 1,762,325 | Blair et al. | June 10, 1930 |
| 2,332,099 | McKinnis | Oct. 19, 1943 |
| 2,455,034 | Zoegall | Nov. 30, 1948 |
| 2,492,379 | Cranston | Dec. 27, 1949 |
| 2,615,116 | Hayes et al. | Oct. 21, 1952 |

FOREIGN PATENTS

| | | |
|---|---|---|
| 383,360 | Germany | Oct. 12, 1923 |